US010758921B2

(12) United States Patent
Lu et al.

(10) Patent No.: US 10,758,921 B2
(45) Date of Patent: Sep. 1, 2020

(54) SEPARATION DEVICE (71) Applicants: China University of Petroleum-Beijing, Beijing (CN); Wuxi Petrochemical Equipment CO., LTD., Wuxi, Jiangsu Province (CN)

(72) Inventors: Chunxi Lu, Beijing (CN); Sihong Gao, Beijing (CN); Yiping Fan, Beijing (CN); Dandan Zhang, Beijing (CN); Min Dai, Wui (CN); Lijun Zhou, Wui (CN)

(73) Assignees: China University of Petroleum-Beijing, Beijing (CN); Wuxi Petrochemical Equipment Co., Ltd., Wuxi, Jiangsu Province (CN)

( * ) Notice: Subject to any disclaimer, the term of this patent is extended or adjusted under 35 U.S.C. 154(b) by 283 days.

(21) Appl. No.: 16/055,321

(22) Filed: Aug. 6, 2018

(65) Prior Publication Data
US 2019/0321833 A1 Oct. 24, 2019

(30) Foreign Application Priority Data
Apr. 24, 2018 (CN) .......................... 2018 1 03725345

(51) Int. Cl.
*B01D 45/12* (2006.01)
*B04C 3/06* (2006.01)
(Continued)

(52) U.S. Cl.
CPC .................. *B04C 3/06* (2013.01); *B04C 3/04* (2013.01); *B04C 5/085* (2013.01); *B04C 5/103* (2013.01);
(Continued)

(58) Field of Classification Search
CPC .. B04C 3/06; B04C 3/04; B04C 5/085; B04C 5/103; B04C 5/187; C10G 11/18;
(Continued)

(56) References Cited

U.S. PATENT DOCUMENTS 2,893,947 A * 7/1959 Berg ...................... C10G 35/12
208/134
2,897,133 A * 7/1959 Berg ...................... C10G 35/12
208/103
(Continued)

FOREIGN PATENT DOCUMENTS

| CN | 2042374 U | 8/1989 |
|---|---|---|
| CN | 2275907 Y | 3/1998 |

(Continued)

*Primary Examiner* — Dung H Bui
(74) *Attorney, Agent, or Firm* — Young Basile Hanlon & MacFarlane, P.C.

(57) ABSTRACT

A separation device, comprising: a third-stage cyclone housing, a separating unit, and a granule recycle and regeneration unit, wherein, the separating unit is disposed inside the third-stage cyclone housing and comprises: a cyclone separator and a moving bed coupled to each other; the granule recycle and regeneration unit comprises: a riser, a spouted bed regenerator, and a regeneration pipe connecting the spouted bed regenerator with the moving bed; the spouted bed regenerator has upper and lower ends opposing to each other, wherein, the upper end of the spouted bed regenerator is provided with a sleeve which opens downwardly, the sleeve divides an interior of the spouted bed regenerator into a fountain area and an annular gap area, and a regenerating gas outlet which is in communication with the annular gap area is provided on a side wall of the spouted bed regenerator. A centrifugal separation and intercepting filtration of the moving granular bed to fine particles can separate fine particles under low pressure drop, and can continuously separate the captured dust particles and the moving bed granules ensuring a sustainable recycling of the moving bed granules.

9 Claims, 6 Drawing Sheets (51) Int. Cl.
*B04C 3/04* (2006.01)
*B04C 5/085* (2006.01)
*B04C 5/103* (2006.01)
*B04C 5/187* (2006.01)
*C10G 11/18* (2006.01)
*B01D 50/00* (2006.01)
*B01J 8/00* (2006.01)
*C10G 11/00* (2006.01)

(52) U.S. Cl.
CPC ............ *B04C 5/187* (2013.01); *B01D 50/002* (2013.01); *B01J 8/005* (2013.01); *B01J 8/006* (2013.01); *B01J 8/0055* (2013.01); *C10G 11/00* (2013.01); *C10G 11/18* (2013.01)

(58) Field of Classification Search
CPC ........ C10G 11/00; B01D 50/002; B01J 8/005; B01J 8/0055; B01J 8/006
See application file for complete search history.

(56) References Cited

U.S. PATENT DOCUMENTS

| | | | | |
|---|---|---|---|---|
| 3,259,565 A * | 7/1966 | Kimberlin, Jr. | .......... | C10G 9/32 208/127 |
| 3,501,394 A * | 3/1970 | Lyons | .............. | C10G 1/02 208/409 |
| 3,886,060 A * | 5/1975 | Owen | .............. | C10G 11/05 208/120.01 |
| 4,088,568 A * | 5/1978 | Schwartz | .............. | C10G 11/18 208/121 |
| 4,094,767 A * | 6/1978 | Gifford, II | .............. | C10G 1/002 201/14 |
| 5,944,982 A * | 8/1999 | Lomas | .............. | C10G 51/06 208/153 |
| 6,814,941 B1 * | 11/2004 | Naunheimer | .......... | B01J 8/0055 422/145 |
| 2002/0144931 A1* | 10/2002 | Sechrist | .............. | B04C 3/06 208/113 |
| 2015/0005553 A1* | 1/2015 | Palmas | .............. | B01J 8/1845 585/300 |
| 2018/0312769 A1* | 11/2018 | Jack | .............. | C10J 3/84 |

FOREIGN PATENT DOCUMENTS

| | | |
|---|---|---|
| CN | 1236660 A | 12/1999 |
| CN | 2526075 Y | 12/2002 |
| CN | 2568308 Y | 8/2003 |
| CN | 1552503 A | 12/2004 |
| CN | 1552504 A | 12/2004 |
| CN | 201006498 Y | 1/2008 |
| CN | 201132137 Y | 10/2008 |
| CN | 201205524 Y | 3/2009 |
| CN | 201304370 Y | 9/2009 |

* cited by examiner

SEPARATION DEVICE

TECHNICAL FIELD

The present invention relates to the technical field of an equipment for petroleum refining, in particular relates to a separation device for conducting a gas-solid separation in an energy recovery system of a fluid catalytic cracking unit.

BACKGROUND

It is estimated that, in the FCC (i.e., Fluid Catalytic Cracking) unit of a refinery, the energy taken away by the flue gas from the regenerator occupies about 26% of the energy consumption of the whole unit. At present, in order to reduce a waste of energy in the flue gas, a flue gas turbine is generally employed to recycle energy in the flue gas. Besides, in order to ensure a long-period stable operation of the flue gas turbine, it is generally required that the concentration of fine particles in the inlet gas of the flue gas turbine should be lowered below 200 mg/m3; it also should be guaranteed that particles greater than 10 μm are totally eliminated. However, the outlet flue gas of the regenerator are dust-laden high-temperature gases, in which the catalyst concentration (under standard state, the same below) is in general from 300 to 1200 mg/m3, and an average particle size thereof is 15 to 30 μm, which cannot meet the demands for the long-period stable operation of the flue gas turbine. In order to ensure the long-period stable operation of the FCC unit, for energy saving and cost reducing, and for reducing pollutions to the atmosphere caused by dust particles contained in the flue gas, a third-stage cyclone separator (hereafter referred to as a third-stage cyclone) is generally provided in a flue gas energy recovery system of the FCC unit.

At present, the third-stage cyclone system usually employs the multi-tubular cyclone separators scheme to purify the dust-laden flue gas. The so called multi-tubular cyclone separator is formed by mounting a plurality of cyclone tubes with a small diameter (the diameter is usually smaller than 300 mm) in parallel in a pressure bearing housing. According to the mounting way of the cyclone tubes, the third-stage cyclone can be divided into the vertical type multi-tubular third-stage cyclone and the horizontal type multi-tubular third-stage cyclone. For those small FCC units, the vertical type third-stage cyclones are usually employed, in comprehensive consideration of factors such as the manufacturing construction, the application effect and the investment economy. For example, Chinese patents CN 2568308Y and CN 201304370Y both relate to the vertical type multi-tubular third-stage cyclones. As for the large FCC units, on the other hand, the horizontal type third-stage cyclones are generally employed because the number of single tubes therein is relatively large, the diameter of the vertical type third-stage cyclone is too large consequentially, and the partition board is too thick and easily deformed. For example, Chinese patents CN 2275907Y, CN 2526075Y and CN 201132137Y all relate to horizontal type multi-tubular third-stage cyclones.

However, the multi-tubular third-stage cyclones have some problems in applications. With the increase of residual blending ratio of raw material and the regeneration temperature, the operations of the FCC unit become very unstable, which brings about the following problems of the third-stage cyclone system:

Firstly, in order to achieve a high gas-solid separating efficiency, the diameter of the cyclone tube is usually designed to be very small; correspondingly, the gas flow rate through a single tube is small. In order to ensure the handling capacity, generally we can only increase the number of the single tubes. In this way, since the number of the single tubes is large, both the floor area and material costs of the third-stage cyclone system increase correspondingly. Besides, the layout structure of the system is complex, which brings about inconvenience for mounting and repair.

Secondly, due to excessive pursuits for separation efficiency of the single tube, the inlet gas velocity of the single tube of the third-stage cyclone is too high, causing a severe wear of the single tube. When the inlet gas velocity of the single tube of the third-stage cyclone is too high, the smashing of catalyst particles will also be aggravated, which will increase the fine powders escaping from the third-stage cyclone, forming severe deposition near the dust exhaust opening of the single pipe of the third-stage cyclone, thereby affecting the operation of the flue gas turbine.

Thirdly, since the inlet gas velocity of the single tube is too high, a pressure drop of the third-stage cyclone reaches up to 15-20 kPa, thus the pressure drop and energy consumption of the system are increased.

The BSX type third-stage cyclone (patents CN 201006498Y and CN 201205524Y) developed by the China Petrochemical Corporation employs a plurality of individual PV type cyclone separators having a large diameter, which are hanged inside the third-stage cyclone housing; the diameter thereof is 800-1200(1300) mm. Compared to the multi-tubular third-stage cyclone, the BSX type third-stage cyclone removes the double-layer partition board of a large thickness and the small diameter single pipes requiring high manufacturing accuracies, instead, it employs several simple structured large diameter cyclone separators, which reduces difficulty in manufacturing, construction, installation, facilitates the repair and replacement of the third-stage cyclone. Besides, since the problems of deformation of the partition board and short-circuit flow and back-mixing of the single tube are not exist, the overall efficiency of the equipment will not decrease after the plurality of cyclones are combined, thus the reliability is high, and the adaptability is good. However, a separation efficiency of the large diameter individual cyclone separator in the BSX type third-stage cyclone is lower than that of the single pipe in the multi-tubular third-stage cyclone. Furthermore, in order to achieve high separation efficiency, the inlet gas velocity of the BSX type third-stage cyclone reaches above 32 m/s. Therefore, the third-stage cyclone system not only has a high pressure drop, but also has an obvious vibration phenomenon in operation, which will cause severe equipment wear and catalyst smashing.

Currently, a dust concentration at the gas outlet of the third-stage cyclone is usually about 150 mg/m3, and the corresponding pressure drop of the third-stage cyclone system ranges from 15 kPa to 20 kPa. As such, the overall separation efficiency of the third-stage cyclone system is not ideal because the pressure drop is high.

In order to improve the separation efficiency and reduce the pressure drop, it is doable to couple a moving bed in the separation system. The moving bed refers to a gas-solid two-phase flow system, which is intermediate regime between a fixed bed and a fluidized bed, and mainly includes three forms, namely, counter-current flow, co-current flow and cross flow. Since the moving bed has advantages of resisting high temperature, simple structured, free of rotating components, long running period and being operable circularly and continuously, it is widely employed in technological processes such as particle drying, filtration and catalytic reforming and the like. Since the granular bed has a good capability in filtering and capturing fine particles and can be adapted to high-temperature high-pressure conditions, in the past twenty years, the moving bed has also been used in the field of gas purification.

For example, Chinese patent (CN 2042374U) has proposed a filter for granules with an auto-moving bed, of which the granular bed applies a louver structure to realize a cyclic and continuous operation of the bed granules. The dipleg at the bottom of the equipment employs a U-shaped pipe delivery structure, and then the delivery of the granules is realized by using a pulsing air flow method.

The counter-current flow type moving bed filter with particle layers (CN 1552503A and CN 1552504A) developed by the Thermal Power Research Institute is used for removing dusts from coal gases or fumes under high temperature and high pressure. The contact of coal gases and fumes with the counter-current flows of the granules can realize high separation efficiency. However, due to the existing problem of local fluidization phenomenon of the bed granules and the dust particles, the equipment is limited to the small gas flow rate, the low operational flexibility, the uneven distribution of granules and gases, as well as the high pressure drop.

The Shanxi Institute of Coal Chemistry of Chinese Academy of Sciences couples a cross flow type granular bed with a surface filter plate (CN 1236660A) for improving the capability of the cross-flow type granular bed in capturing micron-grade particles. It applies the flow of descending granules to restrain the formation of a filter cake on the surface of the filter plate, so as to achieve a stable operating pressure drop. However, due to the blockage of the filter plate and formation of a filter cake on the surface, the pressure drop of the equipment is high. In addition, the purpose of limiting a filter cake on the surface is achieved because of the scouring effect of the freely descending particles. However, the balancing process is hard to be guaranteed.

The prior art also includes other equipment that couple granular bed with other type separator. However, on the whole, the current equipment does not have an ideal effect in separating dust particles from moving bed granules. It is inevitable that the moving bed granules will be mixed with dust particles, thereby affecting the subsequent sustainable recycling utilization of the granules.

SUMMARY

The purpose of the present invention is to provide a separation device capable of overcoming the deficiencies of the prior art. The separation device can realize both centrifugal separation and intercepting filtration for fine particles by a cyclone with moving granular bed, and thus can separate the fine particles highly efficiently under low pressure drop, and can continuously separate the captured dust particles from the moving bed granules highly efficiently, thereby ensuring a sustainable cyclic utilization of the collector granules The above purpose of the present invention can be realized by the following technical solutions.

A separation device, comprising: a third-stage cyclone housing, a separation unit, and a granules recycle and regeneration unit, wherein, the separation unit is disposed inside the third-stage cyclone and comprises: a cyclone separator and a moving bed coupled to each other;

the granules recycle and regeneration unit comprises from bottom to top: a riser, a spouted bed regenerator, and a regeneration inclined pipe connecting the spouted bed regenerator with the moving bed; the spouted bed regenerator has upper and lower ends opposing to each other, wherein, the upper end of the spouted bed regenerator is provided with a sleeve which opens downwardly, the sleeve divides an interior of the spouted bed regenerator into a fountain area and an annular gap area, and a regenerating gas outlet which is in communication with the annular gap area is provided on a side wall of the spouted bed regenerator.

In a preferred embodiment, the third-stage cyclone housing comprises a gas collection chamber, a dust collection chamber at a lower part of the gas collection chamber, and a gas inlet pipe inside the third-stage cyclone housing, a gas outlet is provided on the gas collection chamber, and a particle outlet is provided on the dust collection chamber;

the cyclone separator comprises from top to bottom: a core exhaust tube, a cylinder, a cone, a dust hopper, and a dipleg, wherein, an upper opening of the core exhaust tube is in communication with the gas collection chamber, and a gas inlet which is in communication with the gas inlet pipe is provided on the wall of the cylinder, and wherein, a lower opening of the dipleg is in communication with the dust collection chamber;

the moving bed comprises from top to bottom: a feeder hopper, a material sealing area, a cross-flow area, a moving bed dipleg and a spent granules inclined pipe.

In a preferred embodiment, the wall of the cross-flow area employs a Johnson screen, of which the slot opening is between 0.25 mm and 0.75 mm.

In a preferred embodiment, the number of the separating unit is from 3 to 20, and the separating unit are central symmetric and evenly distributed along a circumference with the gas inlet pipe as the axis.

In a preferred embodiment, the cyclone separator employs a tangential flow reversal type structure having a diameter less than 1.5 m, and the wrapping angle of the volute inlet provided on the cylinder is 180°.

In a preferred embodiment, the sleeve is a cylinder with an opened lower end, and a superficial gas velocity of the annular gap area is equal to a superficial gas velocity in the sleeve.

In a preferred embodiment, the riser comprises, from bottom to top, a pre-lifting section and a lifting section, a pipe diameter of the pre-lifting section being greater than a pipe diameter of the lifting section, the pre-lifting section being provided with a bottom opening which is connected with the spent granule inclined pipe; an upper outlet of the lifting section is located inside the spouted bed regenerator, and is located at the lower end of the sleeve with a predetermined distance therefrom;

the riser is located inside the third-stage cyclone housing, or the riser is located outside the third-stage cyclone housing.

In a preferred embodiment, a gas-stripping annular pipe is further provided in the annular gap between the lifting section and the material bin, and the gas-stripping annular pipe is provided with at least one inlet and a plurality of gas outlet holes.

In a preferred embodiment, a superficial gas velocity of a cross section where the gas-stripping annular pipe is located is 0.5 to 0.8 times of an minimum fluidization velocity of the bed granules in the moving bed; a diameter of the gas-stripping annular pipe is an average value of diameters of the lifting section and the spouted bed regenerator, and a distance from the gas-stripping annular pipe to an upper outlet of the lifting section is 3 times of the diameter of the riser.

In a preferred embodiment, a pre-screening structure is provided at the spent granule inclined pipe, or is provided at the spent granule inclined pipe and a position downstream from the spent granule inclined pipe.

The features and advantages of the present invention are: the embodiments of the present application provide a separation device, which sets a moving bed interlayer inside the large diameter individual cyclone separator of the fluid catalytic cracking third-stage separation system, and organically couples the cyclone separator with a granular bed filter, thereby realizing a reinforcement of the gas-solid separation effect by centrifugal separation and filtering separation synergistically, thus, a dust concentration in gases at the outlet of the third-stage cyclone system can be controlled within 50 mg/m3, and the pressure drop of the third-stage cyclone system can be lowered to 5-10 kPa.

The large diameter individual cyclone separator can reduce the number of individual cyclone separators used in the third-stage cyclone system, thereby lowering the difficulty in mounting and repair, and it can also reduce the inlet gas velocity while ensuring the handling capacity, thereby effectively reducing the pressure drop of the cyclone separator and wear of the equipment. By setting the moving bed, it is possible to avoid an efficiency decline caused by decrease of the inlet gas velocity, so as to ensure an effective separation efficiency of the third-stage cyclone system. A cross-flow area of the moving bed employs a Johnson screen as its wall, with a slot opening between 0.25 mm and 0.75 mm, having a large gas flow area and a small flow resistance. The moving bed has a simple structure, which does not include rotary parts and has a long operating period. An organic coupling of the two can effectively reduce the floor area occupied by the equipment, thus enabling the device to be more compact.

In particular, the separation device provided by the present application is configured with a corresponding granule recycle and regeneration unit according to needs, wherein, the granules recycle and regeneration unit comprises from bottom to top: a riser, a spouted bed regenerator, and a regeneration inclined pipe connecting the spouted bed regenerator with the moving bed; the spouted bed regenerator has upper and lower ends opposing to each other, wherein an upper end of the spouted bed regenerator is provided with a sleeve which opens downwardly, the sleeve divides an interior of the spouted bed regenerator into a fountain area and a annular gap area, and a regenerating gas outlet which is in communication with the annular gap area is provided on a side wall of the spouted bed regenerator, besides, by means of the spouted bed regenerator, the dust particles and moving bed granules can be separated efficiently after the gases are ejected out from the riser, thus the cyclic utilization of the moving bed granules can be realized.

As a whole, the separation device provided by the present application, while reducing the overall pressure drop of the third-stage cyclone system, can improve the separation efficiency, reduce the dust concentration in the expelled flue gas, and improve the energy efficiency and environmental protection level of the device.

Specific embodiments of the present application are disclosed in detail with reference to the descriptions and drawings in the following, pointing out clearly the modes in which the principle of the present application can be employed. It should be appreciated that the embodiments of the present application are not limited in scope thereby. Within the range of the spirit and clauses of the attached claims, the embodiments of the present application include a lot of alternations, modifications and equivalents.

The features which are described and/or indicated with respect to one embodiment can be used in one or more other embodiments in an identical or similar way, can be combined with the features in the other embodiments, or can replace the features in the other embodiments.

It should be emphasized that the term "comprise/include" in use in this text refers to the presence of features, integers, steps or components, but does not exclude the presence or addition of one or more other features, integers, steps or components.

DESCRIPTION OF THE REFERENCE SIGNS

100 third-stage cyclone housing;
101 gas inlet pipe; 102 gas collection chamber; 103 gas outlet; 104 dust collection chamber; 105 particle outlet;
200 separating unit
210 cyclone separator
211 gas inlet; 212 cylinder; 213 cone; 214 dust hopper; 215 dipleg; 216 core exhaust pipe;
220 moving bed;
221 feeder hopper; 222 material sealing area; 223 cross-flow area; 224 moving bed dipleg; 225 spent granule inclined pipe; 226 particle collection bin; 227 pre-screening structure;
300 granule regeneration and circulation system;
301 pre-lifting section; 302 lifting section; 303 spouted bed regenerator; 304 regenerating gas outlet; 305 regeneration inclined pipe; 306 sleeve; 307 annular gap area; 308 gas-stripping annular pipe; 309 support frame; 310 gas outlet hole; 311 gas inlet.

DETAILED DESCRIPTION

A detailed description of the technical solutions of the present invention will be provided in the following in combination with the figures and the specific embodiments. It should be understood that these embodiments are only used to describe the present invention, and are not used to limit the range of the present invention. After reading the present invention, any modifications equivalent to the present invention made by those skilled in the art should fall within the scope defined by the attached claims of the present application.

It should be clearly stated that when an element is referred to as being "provided on" another element, it can be directly on the other element, or intervening elements may also exist. When an element is referred to as being "connected to"

another element, it can be directly connected to the other element, or intervening elements may also exist at the same time. The terms "vertical", "horizontal", "upper", "lower", "left", "right" and similar expressions in this text are used for purpose of explanation only, and do not represent the unique embodiment.

Unless otherwise defined, all technical and scientific terms used in this text have the same meaning as commonly understood by persons skilled in the art to which the present application belongs. The terms used in the Description of the present application are for the purpose of describing the specific embodiments only, and are not intended to limit the present application. The term "and/or" used in this text includes any and all combinations of one or more of the associated listed items.

The present invention provides a separation device capable of overcoming the deficiencies of the prior art. The separation device can realize both centrifugal separation and intercepting filtration of fine particles by a moving granular bed, thus can separate the fine particles efficiently under low pressure drop, and can continuously separate the intercepted dust particles from moving bed granules highly efficiently, thereby ensuring a sustainable recycling of moving bed granules. Therefore, the separation device has a good prospect in practical application.

To be specific, the present application mainly couples a moving bed structure inside a large diameter cyclone separator for the fluid catalytic cracking third-stage separation system, which can reduce a pressure drop of the third-stage cyclone system, and can realize a highly efficient separation of dust particles and moving bed granules while improving a gas-solid separation effect, thereby better ensuring the sustainable recycling of the moving bed granules.

Please refer to FIG. 1 to FIG. 4. An embodiment of the present application provides a separation device comprising: a third-stage cyclone housing 100, a separating unit 200, and a granule recycle and regeneration unit 300. The separating unit 200 is disposed inside the third-stage cyclone housing 100 and comprises: a cyclone separator 210 and a moving bed 220 coupled to each other; the granule recycle and regeneration unit 300 comprises from bottom to top: a riser, a spouted bed regenerator 303, and a regeneration inclined pipe 305 connecting the spouted bed regenerator 303 and the moving bed 220; the spouted bed regenerator 303 has upper and lower ends opposing to each other, wherein, the upper end of the spouted bed regenerator 303 is provided with a sleeve 306 which opens downwardly, the sleeve 306 divides an interior of the spouted bed regenerator 303 into a fountain area and an annular gap area 307, and a regenerating gas outlet 304 which is in communication with the annular gap area 307 is provided on a side wall of the spouted bed regenerator 303.

Figure 1:
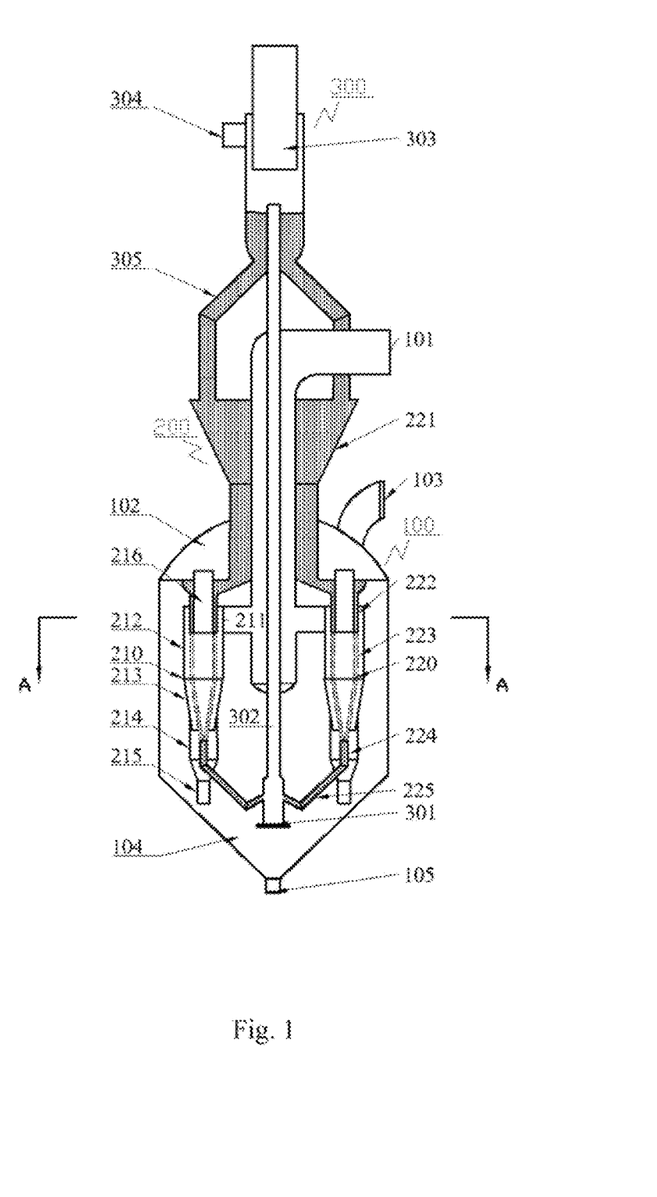
FIG. 1 is a structural schematic diagram of a separation device in the first embodiment of the present application.

In this embodiment, the third-stage cyclone housing 100 comprises a gas collection chamber 102, a dust collection chamber 104 at a lower part of the gas collection chamber 102, and a gas inlet pipe 101 inside the third-stage cyclone housing 100, a gas outlet 103 is provided on the gas collection chamber 102, and a particle outlet 105 is provided on the dust collection chamber 104. The cyclone separator 210 comprises from top to bottom: a core exhaust tube 216, a cylinder 212, a cone 213, a dust hopper 214, and a dipleg 215, wherein, an upper opening of the core exhaust tube 216 is in communication with the gas collection chamber 102, a gas inlet 211 which is in communication with the gas inlet pipe 101 is provided on a wall of the cylinder 212, and a lower opening of the dipleg 215 is in communication with the dust collection chamber 104. The moving bed 220 comprises from top to bottom: a feeder hopper 221, a material sealing area 222, a cross-flow area 223, a moving bed dipleg 224 and a regeneration inclined pipe 225. The cyclone separator 210 and the moving bed 220 being coupled to each other mainly refers to that the two can achieve a synergistic separation effect by cooperation for matters to be separated entered from the gas inlet pipe 101.

A wall of the cross-flow area 223 employs a Johnson screen, of which a slot opening is between 0.25 mm and 0.75 mm. When the wall of the cross-flow area 223 of the moving bed 220 employs a Johnson screen with a slot opening between 0.25 mm and 0.75 mm, it is possible to provide a large gas flow area, thereby reducing the flow resistance of gases passing through in a cross-flow manner.

Figure 2:
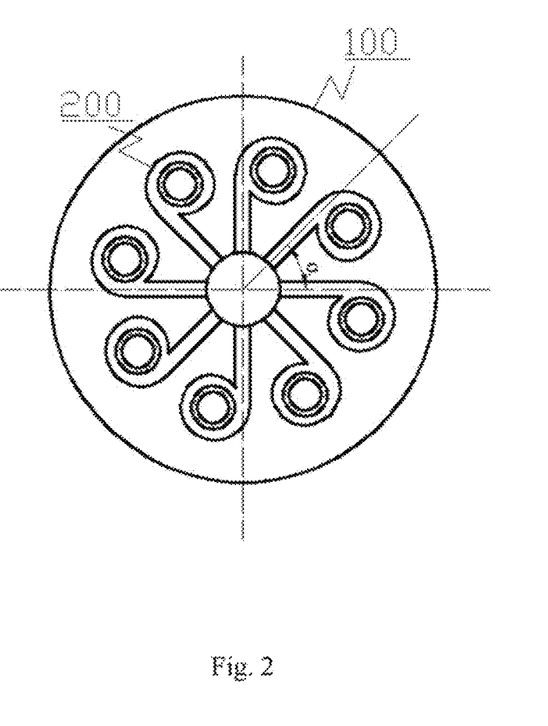
FIG. 2 is an A-A section view of a separation device in the first embodiment of the present application.

The number of the separating unit 200 is from 3 to 20, and the separating units 200 are central symmetric and evenly distributed along a circumference with the gas inlet pipe 101 as an axis.

The cyclone separator 210 employs a tangential flow reversal type structure with a diameter less than 1.5 m, and the gas inlet 211 provided on the cylinder 212 is a volute type gas inlet. A large diameter cyclone separator 210 is selected to be used in the third-stage cyclone system, which can reduce the number of cyclone separators 210 in the third-stage cyclone system, thereby lowering the difficulty in mounting and repair, and also effectively reducing the pressure drop of the cyclone separator 210 and wear of the equipment.

In one embodiment, the riser is located in the third-stage cyclone housing 100, the moving bed 220 employs a sleeve-type interlayer structure which is coaxial with the cyclone separator 210, an inner wall of the interlayer overlaps a wall of the core exhaust pipe 216 of the cyclone separator 210, and a thickness of the interlayer is from 0.05 to 0.3 times of a diameter of the cyclone separator 210. When dust-laden flue gas enters the cyclone separator 210 in a tangential direction, under the effect of centrifugal forces, catalyst particles with large diameter are the first to be separated, and then the moving bed 220 will further capture the fine catalyst particles which cannot be separated by the cyclone separator 210 or can only be separated under extremely high inlet gas velocity conditions, and thus the gas-solid separation effect is further reinforced.

Figure 3:
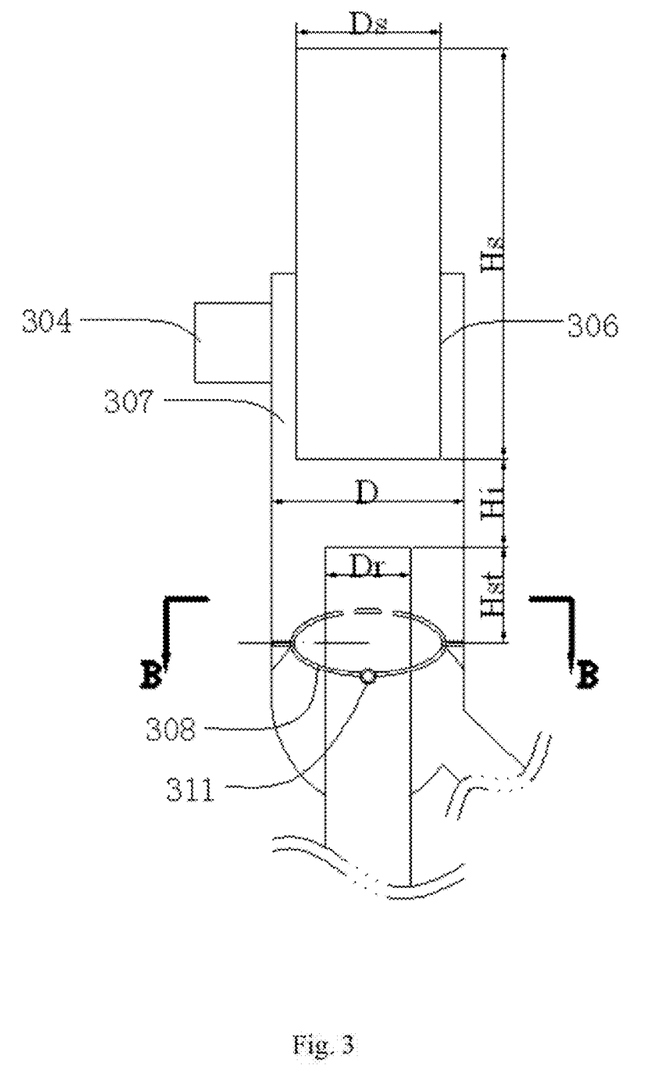
FIG. 3 is a local schematic diagram of a granule recycling system in a separation device in the first embodiment of the present application.
Figure 4:
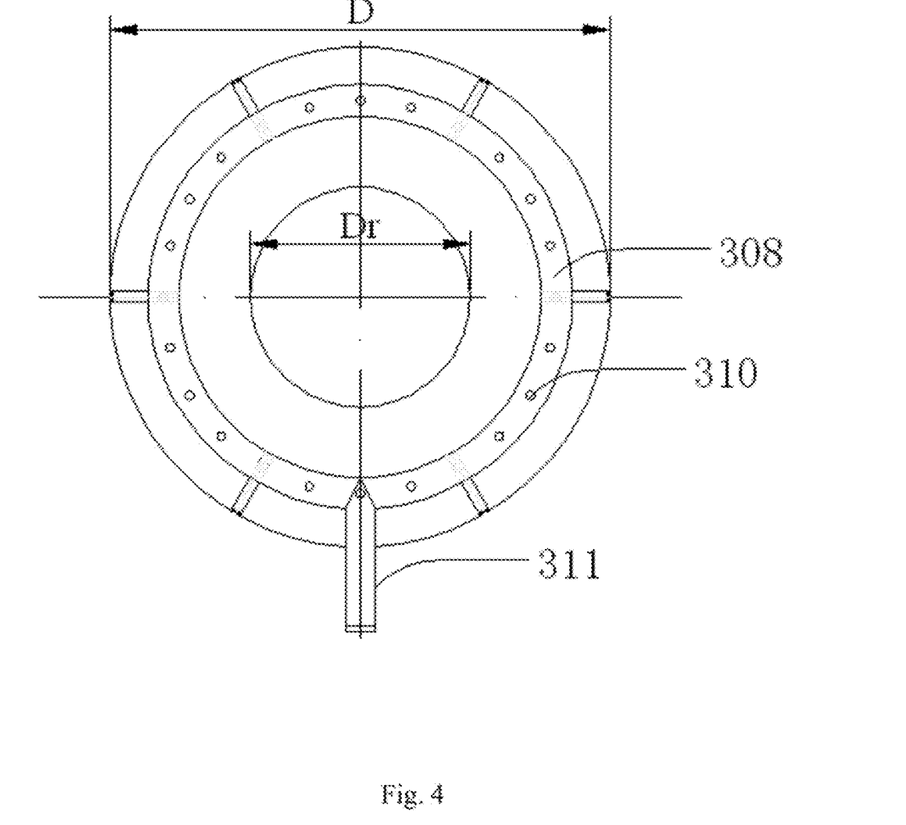
FIG. 4 is a B-B section view of a granule recycling system in a separation device in the first embodiment of the present application.

Please refer to FIG. 3 and FIG. 4. In this embodiment, a sleeve 306 which opens downwardly is provided on a top of the spouted bed regenerator 303, and the sleeve 306 divides the spouted bed regenerator 303 into: a fountain area and an annular gap area 307. To be specific, the sleeve 306 can be a cylindrical barrel an opened lower end, and a diameter Ds thereof is determined by a superficial gas velocity Ug of the gases at an outlet of the lifting section in the sleeve 306.

Wherein, the superficial gas velocity is a kind of superficial velocity, and in general refers to a value obtained in the following way: for a plate tower or packed tower applied in operations such as rectification and absorption, etc., when calculating a gas velocity passing through a fluidized bed, an average velocity of gases passing through the tower is calculated by regarding the tower as empty without considering the components in the bed, and a value is obtained by dividing the gas flow rate by a total cross sectional area of the bed. The superficial velocity can be obtained by: dividing the gas flow rate Q passing through a region within a unit time by a cross sectional area A of the region.

Wherein, the superficial gas velocity in the lifting section 302 is generally set to be 1.3 Ut, wherein, Ut is a transport velocity of the bed granules of the moving bed. The superficial gas velocity Ug of gases in the sleeve 306 should be smaller than an Umf (i.e., minimum fluidization velocity) of the bed granules of the moving bed 220 but greater than a transport velocity of the separated dusts, and in general, the superficial gas velocity is set to be 0.5 to 0.8 times of the minimum fluidization velocity of the moving bed granules. Since the ejected gas flowrate Q and the superficial gas velocity Ug in the sleeve 306 are known, a cross sectional area of the fountain area can be determined based on the above given flowrate, and thus a diameter Ds of the sleeve 306 is determined. A height Hs of the sleeve 306 should be greater than an ejection height of the bed granules.

An ejection height at an outlet of the lifting section 302 can be calculated by an empirical equation, and a ratio of it to the diameter Ds of the sleeve 306 can also be controlled to be 0.5 to 10. A distance Hi from the outlet of the lifting section 302 to the sleeve 306 is determined mainly according to the principle that the sleeve 306 should be able to completely cover the group of ejected bed granules, enabling the bed granules and dusts to be completely separated in the sleeve 306.

A diameter D of the annular gap area is determined by a superficial gas velocity of a cross section of the annular gap area 307. When the diameter of the annular gap area 307 is D, the corresponding cross-sectional area of the annular gap area 307 is: $A_a=\pi(D^2-D_s^2)/4$. The superficial gas velocity of the annular gap area 307 should be smaller than the Umf of the bed granules of the moving bed 220 and greater than a transport velocity of dust particles. In general, the superficial gas velocities of the annular gap area 307 (cross section) and the sleeve 306 are ensured to be equal, and on the premise that the gas flowrate Q is known, the superficial gas velocity of the annular gap area 307 can be determined, and thus the diameter D of the annular gap area 307 can be determined.

In order to promote a further separation of the bed granules of the moving bed 220 from the dusts, a gas-stripping annular pipe 308 is provided at a position on a lower-middle part of the spouted bed regenerator 303 (i.e., the position of the material bin 221) in a distance of Hst (i.e., 3Dr) from the outlet of the lifting section 302. The gas-stripping annular pipe 308 is provided with at least one inlet 311 and a plurality of gas outlet holes 310. After the separation in the fountain area and the annular gap area, there may also be a small amount of dusts mixed in the bed granules. By setting the gas-stripping annular pipe 308, a gas-stripping gas is injected through the inlet 311 and ejected out from the plurality of gas outlet holes 310, which can realize further purification and separation of the bed granules mixed with a small amount of dusts, thereby ensuring that the bed granules entered into the material bin almost do not contain dusts.

To be specific, a diameter of the gas-stripping annular pipe 308 is (D+Dr)/2. The gas-stripping annular pipe 308 can be supported by a support frame 309 which is welded at a wall of the spouted bed regenerator 303. To be specific, the number of the support frame 309 can be 6. The 6 support frames 309 can be evenly distributed along a circumference of the spouted bed regenerator 303.

The gas-stripping annular pipe 308 is opened with a plurality of gas outlet holes 310 on its bottom face to prevent the gas outlet holes 310 from being blocked by particulate matters. The plurality of gas outlet holes 310 are evenly distributed along a circumference of the annular pipe. To be specific, the number of the gas outlet holes 310 can be determined according to actual requirements, for example, the number of the gas outlet holes 310 can be 24, and of course can be more or less than 24. The present application does not make a unique definition to this here.

The gas amount in the gas-stripping annular pipe 308 is determined by controlling the superficial gas velocity corresponding to the cross section (the cross sectional area is $A_{st}=\pi(D^2-D_r^2)/4$) where the annular pipe is located. The superficial gas velocity of the cross section where the gas-stripping annular pipe 308 is located is controlled to be 0.5 to 0.8 times of the Umf of the bed granules of the moving bed 220, so as to ensure that the dusts are carried out completely and the bed granules of the moving bed 220 can fall freely.

A depth of the lifting section 302 getting into the spouted bed regenerator 303 can be decided according to the quantity of the bed granules of the moving bed 220 required to be stored in the material bin 221 part of the spouted bed regenerator 303 in practical applications. For example, the spouted bed regenerator 303 is a cylindrical structure with a diameter of D according to the quantity of the bed granules of the moving bed 220 that needs to be stored. In addition, a structure in which a material bin 221 part has an increased height or enlarged diameter can be employed, and the specific height and diameter of the material bin 221 can be determined according to actual requirements.

The separation device provided by the present application sets a moving bed interlayer inside the large diameter individual cyclone separator 210 of the catalytic cracking third-stage separation system, and organically couples the cyclone separator 210 with the granular bed 220, thereby realizing a reinforcement of the gas-solid separation effect by centrifugal separation and filtering separation synergistically, thus, a dust concentration in the gases at the outlet of the third-stage cyclone system can be controlled within 50 mg/m3, and the pressure drop of the third-stage cyclone system can be lowered to 5-10 kPa.

The individual cyclone separator 210 with a large diameter can reduce the number of the cyclone separator 210 in the third-stage cyclone system, thereby lowering the difficulty in mounting and repairing, and can also decrease an inlet gas velocity while ensuring the handling capacity, thereby effectively reducing the pressure drop of the cyclone separator 210 and wear of the equipment. By introducing the moving bed 220, it is possible to avoid the problem of efficiency decline caused by decreased inlet gas velocity, thereby ensuring an effective separation efficiency of the third-stage cyclone system. The cross-flow area 223 of the moving bed 220 employs a Johnson screen as its wall, of which a slot opening is between 0.25 mm and 0.75 mm, having a large gas flow area and a small flow resistance. The moving bed 220 has a simple structure, which does not include a rotary part, and has a long operating period. An organic coupling of the cyclone separator 210 and the moving bed 220 can effectively reduce the floor area occupied by the equipment, thus enabling the device to be more compact.

In particular, the separation device provided by the present application is configured with a corresponding granules recycle and regeneration unit 300 according to needs, wherein, the granule recycle and regeneration unit 300 comprises from bottom to top: a riser, a spouted bed regenerator 303, and a regeneration inclined pipe 225 connecting the spouted bed regenerator 303 and the moving bed 220; the spouted bed regenerator 303 has upper and lower ends opposing to each other, wherein, the upper end of the spouted bed regenerator 303 is provided with a sleeve 306 which opens downwardly, the sleeve 306 divides an interior of the spouted bed regenerator 303 into a fountain area and an annular gap area 307, a regenerating gas outlet 304 which is in communication with the annular gap area 307 is provided on a side wall of the spouted bed regenerator 303, and by introducing the spouted bed regenerator 303, dust particles and moving bed granules can be separated highly efficiently after the gases are ejected out from the riser, and then a cyclic utilization of the moving bed granules can be realized.

As a whole, the separation device provided by the present application, while reducing the pressure drop of the third-stage cyclone system, can improve the separation efficiency, reduce the dust concentration in the discharged flue gas and improve the energy efficiency and environmental protection level of the device.

Additionally, the corresponding granule recycle and regeneration unit 300 can be configured according to needs, so as to realize the cyclic utilization of granules of the moving bed 220. The structure of the device can be configured in at least three different forms: setting a built-in granule regeneration system, setting an external granule regeneration system, and setting a pre-screening structure at parts such as the spent granules inclined pipe and particle collection bin, which respectively correspond to the following three embodiments. Detailed descriptions will be given in the following in combination with the specific embodiments and the figures.

FIG. 1 is a structural schematic diagram of the separation device in the first embodiment, and to be specific, is a structural schematic diagram of an FCC third-stage separation system with a built-in granule recycle and regeneration unit. FIG. 2 is a plan view of arrangement of the separating unit in the third-stage cyclone housing 100 in the first embodiment, and the arranging method of the separating units in the third-stage cyclone housing 100 in the other embodiments are the same as that in this embodiment.

The separation device can comprise a third stage cyclone housing 100, a separating unit 200, and a granule recycle and regeneration unit. The granule recycle and regeneration unit 300 is in particular a built-in granule recycle and regeneration unit.

An upper part of the third-stage cyclone housing 100 is provided with a gas inlet pipe 101, a gas collection chamber 102 and a gas outlet 103, and a lower part thereof is provided with a dust collection chamber 104 and a particle outlet 105.

The separating unit can be formed by a cyclone separator 210 and a moving bed 220 coupled to each other, and is hanged inside the third-stage cyclone housing 100. The number of the separating unit 200 can be set as n according to the gas amount processed, wherein 3≤n≤20. As shown in FIG. 2, the plurality of separating units is in central symmetric and evenly distributed along a circumference with the gas inlet pipe 101 as an axis.

The cyclone separator 210 can comprise: a volute gas inlet 211, a cylinder 212, a cone 213, a dust hopper 214, a dipleg 215 and a core exhaust pipe 216.

The moving bed 220 can comprise from top to bottom: a feeder hopper 221, a material sealing area 222, a cross-flow area 223, a moving bed dipleg 224 and a spent granule inclined pipe 225.

In this embodiment, the granule recycle and regeneration unit 300 can employ a structure of a combination of riser and spouted bed to conduct the cyclic regeneration of the moving bed granules, and it comprises, in sequence from bottom to top, a pre-lifting section 301, a lifting section 302, a spouted bed regenerator 303, a regenerating gas outlet 304 and a regeneration inclined pipe 305. The lifting section 302 is provided inside the third-stage cyclone housing 100, and is connected with the spouted bed regenerator 303 provided on the upper part of the third-stage cyclone housing 100 after passing through the gas inlet pipe 101 along a central axis thereof, and a bottom part of the spouted bed regenerator 303 is in communication with the material bin 221 of the moving bed by the regeneration inclined pipe 305.

The working process of the separation device provided by this embodiment is as follows.

First, flue gas uniformly enter each separating unit 200 (descriptions in the following will take one separating unit 200 as an example) from the gas inlet pipe 101 at the upper part of the third-stage cyclone housing 100. Then, the flue gas enters tangentially along a volute type inlet 211 of the cyclone separator 210, forming a rotational flow in the cylinder 212 and the cone 213. During the rotational downward movement of the main flow of the flue gas, part of the gases gradually passes through a cross-flow area 223 of the moving bed 220 radially, converges at the core exhaust tube 216 and thereafter enters the gas collection chamber 102 at the upper part of the third-stage cyclone housing 100. In the meantime, catalyst particles contained in the flue gas are thrown to a side wall of the cyclone separator 210 under the effect of centrifugal forces, fall into the dust hopper 214 along the cylinder 212 and the cone 213, and then discharged through the dipleg 215 into the dust collection chamber 104 at the lower part of the third-stage cyclone housing 100, thereby achieving the gas-solid centrifugal separation.

The moving bed 220 which is coaxial with the cylinder 212 and the cone 213 of the cyclone separator is provided at the lower end of the core exhaust tube 216 of the cyclone separator 210. The moving bed granules naturally flow down from the material bin 221 provided outside the third-stage cyclone housing 100 under the effect of gravity, and respectively flow through the material bin 222 and the cross-flow area 223 of each moving bed 220 inside the cyclone separator 210. During the rotational downward movement of the main flow of the flue gas, part of the gases gradually passes through the cross-flow area 223 of the moving bed 220 radially. A wall of the cross-flow area 223 is in a mesh structure. To be specific, the wall of the cross-flow area 223 can employ a Johnson screen, so as to bring the flue gas into cross-flow contact with the granules, and thereby the filtering separation process is finished.

As for the fine catalyst particles which cannot be separated by the cyclone separator 210 or can only be separated under extremely high gas velocities, the moving bed 220 can play a role of intercepting filtration, so that the gas-solid separation efficiency is effectively improved. The purified flue gasses are discharged into the gas collection chamber 102 at the upper part of the third-stage cyclone housing 100 via the core exhaust tube 216 of the cyclone separator 210, and then expelled from the gas outlet 103. The moving bed granules and the captured catalyst particles are delivered to the pre-lifting section 301 via the moving bed dipleg 224 and the spent granule inclined pipe 225, and are delivered along the lifting section 302 into the spouted bed regenerator 303 at the upper part of the third-stage cyclone housing 100 under the effect of a striping gas.

The moving bed granules enter the spouted bed regenerator 303 provided with a sleeve 306 under the effect of a spouted gas, and are separated from the captured catalyst particles, thereby the regeneration is realized. To be specific, the moving bed granules having large granularities settle down under the effect of gravity, while the catalyst particles having small granularities flow out of the granule recycle and regeneration unit 300 through the regenerating gas outlet 304 at the upper part of the spouted bed regenerator 303 along with regenerating gases. The moving bed granules after the regeneration are delivered to the material bin 221 of the moving bed 220 through the regeneration inclined pipe 305, and after that the whole granules regeneration and circulation loop is finished.

Please refer to FIG. 3 and FIG. 4. In this embodiment, a sleeve 306 which opens downwardly is provided on a top of the spouted bed regenerator 303, and the sleeve 306 divides the spouted bed regenerator 303 into: a fountain area and an annular gap area 307. To be specific, the sleeve 306 can be a cylinder with an opened lower end, and a diameter Ds thereof is determined by a superficial gas velocity Ug of gases at an outlet of the lifting section 302 in the sleeve 306.

The superficial gas velocity is a kind of superficial velocity, and in general refers to a value obtained in the following way: for a plate tower or packed tower applied in operations such as rectification and absorption, etc., when calculating a gas velocity passing through a fluidized bed, an average velocity of gases passing through the tower is calculated by regarding the tower as empty, without considering the components in the bed, and the value is obtained by dividing a flowrate of the gases by a total cross sectional area of the bed. The superficial velocity can be obtained by: dividing a flowrate Q passing through a region within a unit time by a cross sectional area A of the region.

The superficial gas velocity in the lifting section 302 is generally set to be 1.3 $U_t$ ($U_t$ is a transport velocity of the granules of the moving bed). The superficial gas velocity $U_g$ in the sleeve 306 should be smaller than an $U_{mf}$ (i.e., a minimum fluidization velocity) of the granules of the moving bed 220 but greater than a transport velocity of the captured dusts. A diameter $D_s$ of the sleeve 306 is determined according to a superficial gas velocity $U_g$ in the sleeve 306. A height $H_s$ of the sleeve 306 should be greater than an ejection height of the bed granules.

The ejection height at the outlet of the lifting section 302 can be calculated by an empirical equation, and can also be obtained by controlling a ratio of it to the diameter Ds of the sleeve 306 (from 0.5 to 10). A distance Hi from the outlet of the lifting section 302 to the sleeve 306 is determined mainly based on a principle that the sleeve 306 should be able to completely cover the group of the ejected bed granules, making the bed granules and dusts be completely separated in the sleeve 306.

A diameter D of the annular gap area is determined by a superficial gas velocity of a cross section of the annular gap area 307. When the diameter of the annular gap area 307 is D, the corresponding cross-sectional area of the annular gap area 307 is: $A_a = \pi(D^2 - D_s^2)/4$. The superficial gas velocity of the cross section of the annular gap area 307 should be smaller than the Umf of the bed granules of the moving bed 220 and greater than a transport velocity of the dust particles. In general, the superficial gas velocity of the cross section of the annular gap area 307 and that in the sleeve 306 are ensured to be equal, thus the diameter D of the annular gap area 307 can be determined.

In order to promote a complete separation of the bed granules of the moving bed 220 and the dusts, a gas-stripping annular pipe 308 is provided at a position on a lower-middle part of the spouted bed regenerator 303 (i.e., the position of the material bin 221) with a distance of Hst (i.e., 3Dr) from the outlet of the lifting section 302. A diameter of the gas-stripping annular pipe 308 is (D+Dr)/2. The gas-stripping annular pipe 308 can be supported by a support frame 309 which is welded at a wall face of the spouted bed regenerator 303.

To be specific, the number of the support frame 309 can be 6, and the the 6 support frames 309 can be evenly distributed along a circumference of the spouted bed regenerator 303. The gas-stripping annular pipe 308 is opened with a gas outlet hole 310 on its bottom face to prevent the gas outlet hole 310 from being blocked by particulate matters. The gas outlet holes 310 are uniformly distributed along a circumference of the annular pipe. To be specific, the number of the gas outlet holes 310 can be determined according to actual needs, for example, the number of the gas outlet holes 310 can be 24, and of course can be more or less than 24. The present application does not make any unique definition to this here.

The gas amount of the gas-stripping annular pipe 308 is determined by the corresponding superficial gas velocity passing through the cross section (the cross-sectional area is $A_{st} = \pi(D^2 - D_r^2)/4$) where the annular pipe is located. The superficial gas velocity of the cross section where the gas-stripping annular pipe 308 is located is controlled to be 0.5 to 0.8 times of the Umf of the bed granules of the moving bed 220, so as to ensure that the dusts are carried out completely, and the bed granules of the moving bed 220 can fall freely.

A depth of the lifting section 302 getting into the spouted bed regenerator 303 can be decided according to the quantity of bed granules of the moving bed 220 required to be stored in the material bin 221 part of the spouted bed regenerator 303 in practical applications. For example, the spouted bed regenerator 303 is a cylindrical structure with a diameter of D according to the quantity of bed granules of the moving bed 220. In addition, a structure having a material bin 221 part which has an increased height or enlarged diameter can be employed, and the specific height and diameter of the material bin 221 can be determined according to actual requirements.

Figure 5:
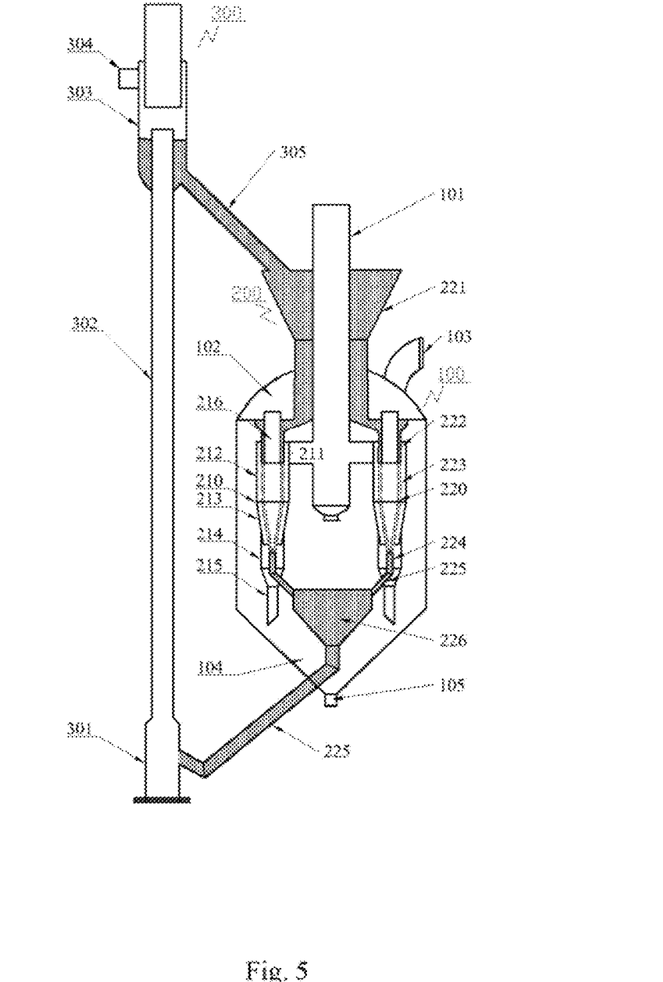
FIG. 5 is a structural schematic diagram of a separation device in the second embodiment of the present application.

FIG. 5 is a schematic diagram of the mechanism of the separation device in the second embodiment, and to be specific, is a structural schematic diagram of an FCC third-stage separation system with an external granule recycle and regeneration unit.

The separation device can comprise a third stage cyclone housing 100, a separating unit 200, and a granule recycle and regeneration unit. The granule recycle and regeneration unit 300 is in particular an external granule recycle and regeneration unit.

An upper part of the third-stage cyclone housing is provided with a gas inlet pipe 101, a gas collection chamber 102 and a gas outlet 103, and a lower end thereof is provided with a dust collection chamber 104 and a particle outlet 105.

The separating unit 200 is formed by a cyclone separator 210 and a built-in moving bed 220 coupled to each other, and is hanged inside the third-stage cyclone housing 100. The number of the separating unit 200 can be set as n according to the gas amount processed thereby, wherein 3≤n≤20. The plurality of separating units 200 is central symmetric and evenly distributed along a circumference with the gas inlet pipe 101 as an axis.

The cyclone separator 210 comprises a volute type gas inlet 211, a cylinder 212, a cone 213, a dust hopper 214, a dipleg 215 and a core exhaust tube 216.

The moving bed 220 comprises from top to bottom: a feeder hopper 221, a material sealing area 222, a cross-flow area 223, a moving bed dipleg 224, a regeneration inclined pipe 225, and a particle collection bin 226.

In this embodiment, the granule recycle and regeneration unit 300 can employ a structure of a combination of riser and spouted bed to conduct the cyclic regeneration process of the moving bed granules, and it comprises, in sequence from bottom to top, a pre-lifting section 301, a lifting section 302, a spouted bed regenerator 303, a regenerating gas outlet 304 and a regeneration inclined pipe 305. The lifting section 302 is provided outside the third-stage cyclone housing 100, the lifting section 302 is in connection with the spouted bed regenerator 303 which is provided outside the third-stage cyclone 100, and a bottom part of the spouted bed regenerator 303 is in communication with the material bin 221 of the moving bed through the regeneration inclined pipe 305.

The working process of the separation device provided by this embodiment is as follows.

First, flue gas uniformly enter each separating unit 200 (the description in the following will take one separating unit 200 as an example) from the gas inlet pipe 101 at the upper part of the third-stage cyclone housing 100. Then, the flue gas enters tangentially along a volute type inlet 211 of the cyclone separator 210, forming a rotational flow in the cylinder 212 and the cone 213. During the rotational downward movement of the main flow of the flue gas, part of the gases gradually passes through a cross-flow area 223 of the moving bed 220 radially, converges at the core exhaust tube 216 and thereafter enters the gas collection chamber 102 at the upper part of the third-stage cyclone housing 100. In the meantime, catalyst particles contained in the flue gas are thrown to a side wall of the cyclone separator 210 under the effect of centrifugal forces, fall into the dust hopper 214 along the cylinder 212 and the cone 213, and then discharged through the dipleg 215 into the dust collection chamber 104 at the lower part of the third-stage cyclone housing 100, thereby achieving the gas-solid centrifugal separation.

The moving bed 220 which is coaxial with the cylinder 212 and the cone 213 of the cyclone separator is provided at a lower end of the core exhaust tube 216 of the cyclone separator 210. The moving bed granules naturally flow down from the material bin 221 provided outside the third-stage cyclone housing 100 under the effect of gravity, and respectively flow through the material bin 222 and the cross-flow area 223 of each moving bed 220 in the cyclone separator 210.

During the rotational downward movement of the main flow of the flue gas, part of the gases gradually passes through the cross-flow area 223 of the moving bed 220 radially. A wall of the cross-flow area 223 is in a mesh structure. To be specific, the wall of the cross-flow area 223 can employ a Johnson screen, so as to bring the flue gas into cross-flow contact with the granules, thereby finishing the filtering separation process.

As for the fine particles which cannot be separated by the cyclone separator 210 or can only be separated under extremely high inlet gas velocities, the moving bed 220 can play a role of intercepting filtration, so that the gas-solid separation efficiency is effectively improved. The purified flue gas is discharged into the gas collection chamber 102 on the upper part of the third-stage cyclone housing 100 through the core exhaust tube 216 of the cyclone separator 210, and then expelled from the gas outlet 103. The moving bed granules and the captured catalyst particles are delivered to the pre-lifting section 301 through the moving bed dipleg 224 and the spent granule inclined pipe 225, and are delivered along the lifting section 302 into the spouted bed regenerator 303 under the effect of a lifting gas.

The moving bed granules enter the spouted bed regenerator 303 which is provided with the sleeve 306 under the effect of a spouted gas, and are separated from the captured catalyst particles, and thus the regeneration is realized. To be specific, the moving bed granules having large granularities settle down under the effect of gravity, while the captured catalyst particles flow out of the granules recycle and regeneration unit through the regeneration gas outlet 304 at the upper part of the spouted bed regenerator 303 along with the regenerating gases. The moving bed granules after the regeneration are delivered to the material bin 221 of the moving bed 220 through the regeneration inclined pipe 305, and after that the whole granule regeneration and circulation loop is finished.

Figure 6:
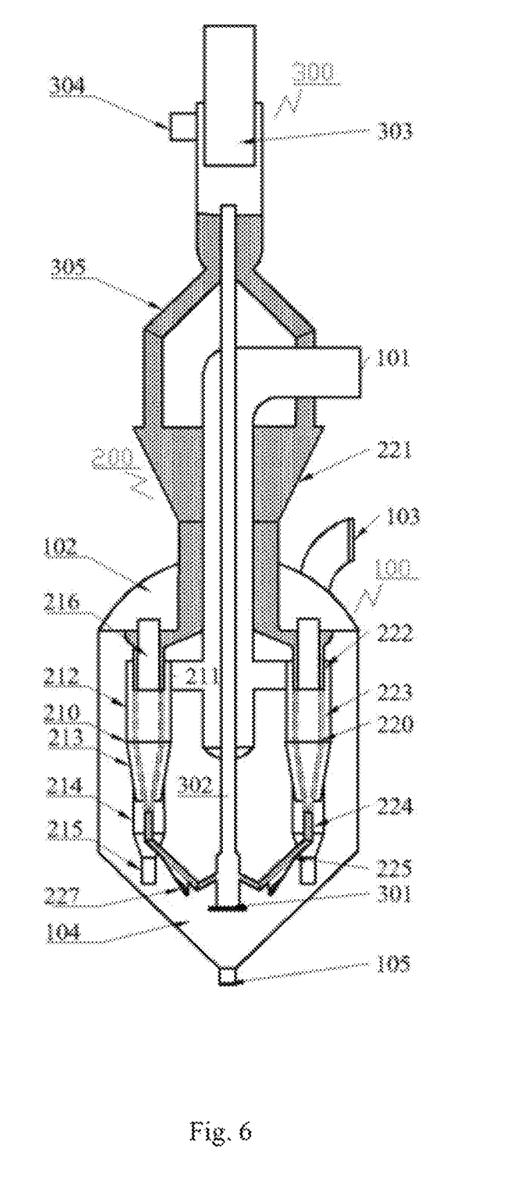
FIG. 6 is a structural schematic diagram of a separation device in the third embodiment of the present application.

FIG. 6 is a structural schematic diagram of the separation device in the third embodiment, and to be specific, is a structural schematic diagram of an FCC third-stage separation system with a granule recycle and regeneration unit which is provided with a pre-screening structure.

This embodiment, based on the structures of the first or second embodiment, sets a pre-screening structure 227 at the parts such as the spent granules inclined pipe 225 and the particle collection bin 226 of the equipment, so as to realize a pre-separation of the captured catalyst particles and the moving bed granules, thereby reducing a subsequent load to the granule recycle and regeneration unit 300.

The pre-screening structure 227 refers to a mesh structure employed as a lower wall of the components such as the spent granule inclined pipe 225 and the particle collection bin 226 in which the particles are flowing. The mesh structure in particular can be a mesh screening structure such as a Johnson screen. The pre-screening structure 227 is able to conduct a preliminary screening of the moving bed granules which have captured the catalysts. In its working process, the moving bed granules flow from the moving bed dipleg 215 through the renewable inclined pipe 225 and the particle collection bin 226, the pre-screening structure can screen part of the catalyst particles captured by the moving bed granules in advance, so that a subsequent regeneration load to the granule recycle and regeneration unit 300 can be reduced.

Any numerical value cited in this text includes all values including the lower and the upper values, in increments of one unit, between the lower limiting value to the upper limiting value, provided that there is a separation of at least two units between any lower value and any higher value. For example, if it is elaborated that the value of the number of a component or of a process variable (such as temperature, pressure, time, etc.) is from 1 to 90, preferably from 20-80, and more preferably from 30-70, then the purpose is to illustrate that the Description also explicitly lists the values such as from 15-85, from 22 to 68, from 43 to 51 and from 30-32. As for values smaller than 1, it shall be appreciated appropriately that one unit is 0.0001, 0.001, 0.01 or 0.1. These are only examples for explicit expression, and it can be regarded that all possible combinations of values listed between the minimum value and the maximum value have been explicitly elaborated in a similar way in the Description.

Unless otherwise stated, all ranges include the endpoints and all numbers that fall between the endpoints. The use of "about" or "approximately" together with a range applies to both ends of the range. Therefore, the expression "about 20 to 30" is intended to cover "about 20 to about 30", and at least includes the expressly pointed out endpoints.

The disclosures of all articles and references, including patent applications and publications, are incorporated therein by reference for all purposes. The term "substantially consists of . . . " which describes a combination should include the determined elements, components, parts or steps, as well as other elements, components, parts or steps that in substance do not affect the basic novel features of the combination. The use of terms "contain" or "comprise" to describe the combination of the elements, components, parts or steps therein also take into account the embodiment substantially constructed by these elements, components, parts or steps. Here, by using the term "can", it is intended to explain that any described attribute that "can" be included is selectable.

Multiple elements, components, parts or steps can be provided by a single integral element, component, part or step. Alternatively, a single integral element, component, part or step can be divided into a plurality of separated elements, components, parts or steps. The terms "a" or "one" used to describe the elements, components, parts or steps are not intended to exclude other elements, components, parts or steps.

The above embodiments in this Description are described in a progressive manner, references can be made to each other for the identical or similar parts between the embodiments, and the focus of each embodiment is its difference from the other embodiments.

The above are only some embodiments of the present invention. Although the embodiments disclosed by the present invention are as above, the contents are only the embodiments employed for the convenience of comprehension of the invention, and are not used to limit the present invention. Any person skilled in this field to which the present invention pertains can make any modification and alternation on the form and details of the embodiments without deviating from the spirit and scope of the present invention, but the patent protection scope of the present invention should still subject to the range limited by the attached claims.

We claim:

1. A separation device, wherein, comprising:
    a third-stage cyclone housing comprising:
        a gas collection chamber,
        a dust collection chamber at a lower part of the gas collection chamber,
        a gas inlet pipe inside the third-stage cyclone housing,
        a gas outlet on the gas collection chamber, and
        a particle outlet on the dust connection chamber;
    a separating unit disposed inside the third-stage cyclone housing and comprising:
    a moving bed coupled to a cyclone separator, the moving bed comprises in sequence from top to bottom:
        a material bin,
        a material sealing area,
        a cross-flow area, a moving bed dipleg, and
        a spent granule inclined pipe; and
    a granule recycle and regeneration unit comprises from bottom to top:
        a riser,
        a spouted bed regenerator, and
        a regeneration inclined pipe connecting the spouted bed regenerator with the moving bed;
    wherein the spouted bed regenerator has an upper end and a lower end opposing each other, with the upper end of the spouted bed regenerator having a sleeve which opens downwardly to divide an interior of the spouted bed regenerator into a fountain area and an annular gap area, and
    wherein a regenerating gas outlet is provided on a side wall of the spouted bed regenerator and is in communication with the annular gap area;
    wherein a lifting section connects the regeneration unit to the separating unit so that material from the separating unit is movable into the regeneration unit.

2. The separation device according to claim 1, wherein, a wall of the cross-flow area employs a Johnson screen, of which a slot opening is between 0.25 mm and 0.75 mm.

3. The separation device according to claim 1, wherein, a number of the separating unit is from 3 to 20, and the separating units are central symmetric and evenly distributed along a circumference with the gas inlet pipe as an axis.

4. The separation device according to claim 3, wherein, the cyclone separator employs a tangential flow reversal type structure with a diameter less than 1.5 m, and the gas inlet pipe is a volute type gas inlet.

5. The separation device according to claim 4, wherein, the sleeve is a cylinder with an opened lower end, and a superficial gas velocity of the annular gap area is equal to a superficial gas velocity in the sleeve.

6. The separation device according to claim 5, wherein, the riser comprises, from bottom to top, a pre-lifting section and the lifting section, a pipe diameter of the pre-lifting section being greater than a pipe diameter of the lifting section, the pre-lifting section being provided with a bottom opening which is connected with the spent granule inclined pipe; an upper end outlet of the lifting section is located inside the spouted bed regenerator, and is located at the lower end of the sleeve with a predetermined distance therefrom;
    the riser is located inside the third-stage cyclone housing, or the riser is located outside the third-stage cyclone housing.

7. The separation device according to claim 6, wherein, a gas-stripping annular pipe is further provided in an annular gap between the lifting section and the material bin, and at least one inlet and a plurality of gas outlet holes are provided on the gas-stripping annular pipe.

8. The separation device according to claim 7, wherein, a superficial gas velocity of a cross-section of the gas-stripping annular pipe is 0.5 to 0.8 times of a minimum fluidization velocity of granules of the moving bed; a diameter of the gas-stripping annular pipe is an average value of diameters of the lifting section and the spouted bed regenerator, and a distance from the gas-stripping annular pipe to an upper outlet of the lifting section is 3 times of the diameter of the riser.

9. The separation device according to claim 8, wherein, a pre-screening structure is provided at the spent granule inclined pipe, or is provided at the spent granule inclined pipe and a position downstream from the spent granule inclined pipe.

* * * * *